Mar. 27, 1923.
E. H. BECKER.
PRIMARY BATTERY.
FILED NOV. 18, 1921.
1,450,059.
3 SHEETS—SHEET 1.
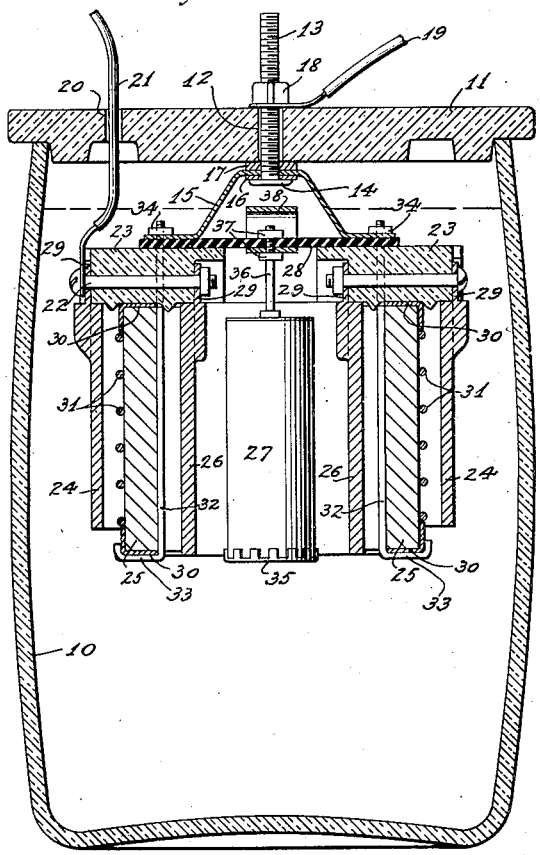
Fig. 1
Fig. 2
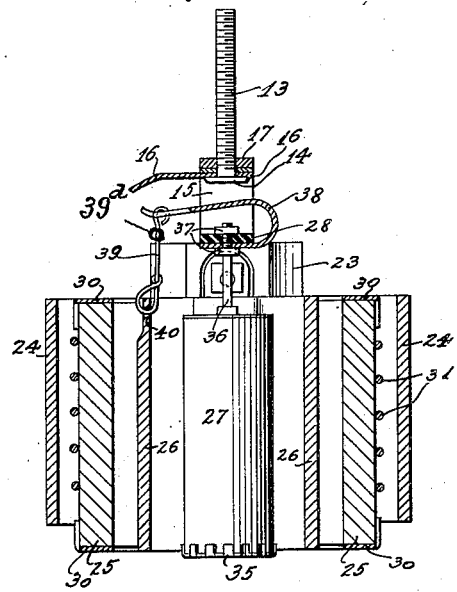
Fig. 3
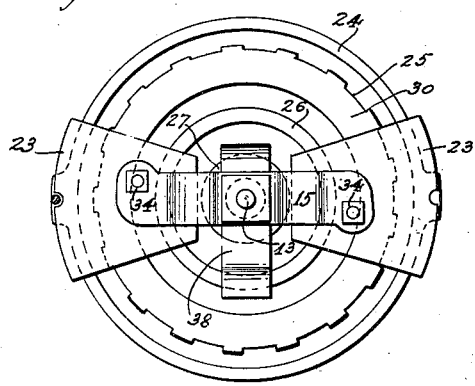
Fig. 4
INVENTOR
Edmund H. Becker
BY
Chamberlain & Newman ATTORNEYS.

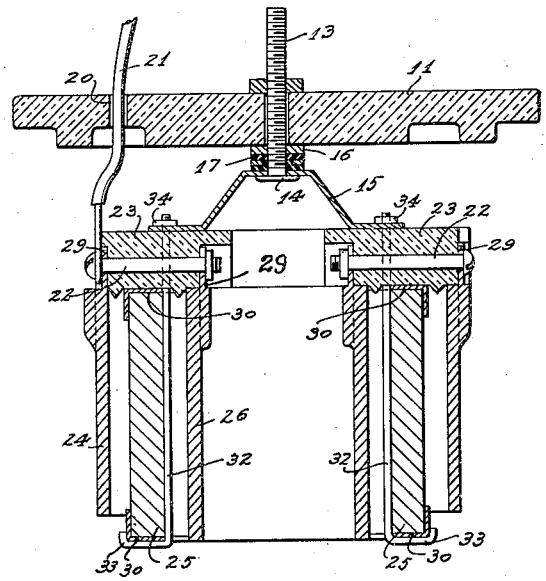
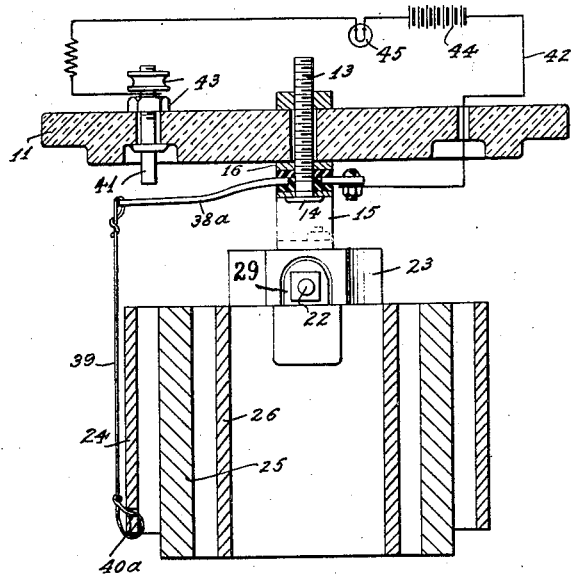

Mar. 27, 1923.
E. H. BECKER.
PRIMARY BATTERY.
FILED NOV. 18, 1921.
1,450,059.
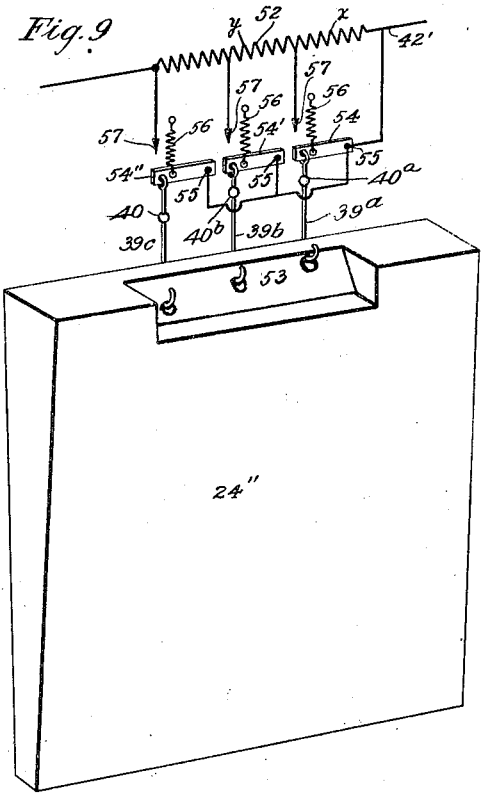
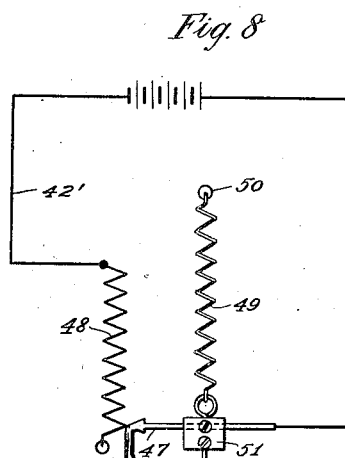
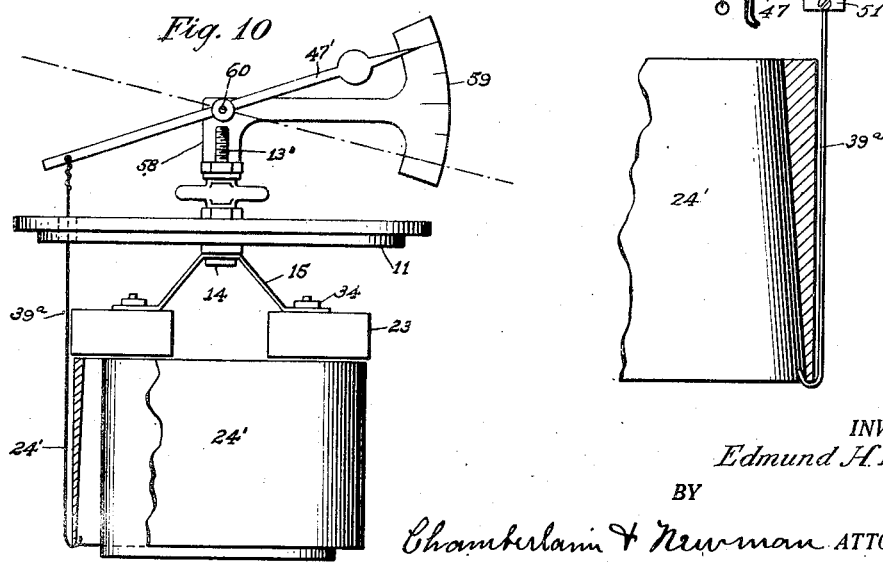
INVENTOR.
Edmund H. Becker
BY
Chamberlain & Newman ATTORNEYS.

Patented Mar. 27, 1923.

1,450,059

UNITED STATES PATENT OFFICE.

EDMUND H. BECKER, OF WATERBURY, CONNECTICUT, ASSIGNOR TO THE WATERBURY BATTERY CO., OF WATERBURY, CONNECTICUT, A CORPORATION OF CONNECTICUT.

PRIMARY BATTERY.

Application filed November 18, 1921. Serial No. 516,047.

*To all whom it may concern:*

Be it known that EDMUND H. BECKER, a citizen of the United States, and resident of Waterbury, in the county of New Haven and State of Connecticut, has invented certain new and useful Improvements in Primary Batteries, of which the following is a specification.

This invention relates to improvements in primary batteries of the class comprising a zinc and copper couple submerged within a suitable active solution, and designed to disclose evidence of its approaching state of exhaustion.

The object of the invention is to provide as an intergal part of the assembled battery element, a mechanically actuated device, designed to be operated at any predetermined period within the ampere hour capacity of the cell, for automatically accomplishing any one of several objects, as for instance, to automatically indicate the state of exhaustion of the battery when that occurs or to indicate the amount of electrical energy still available, by a suitable signal, such as a lamp or bell; or to automatically close a circuit and thereby connect up and introduce a new element in the cell; and further to automatically add booster cells to the battery or to replace the exhausted battery.

This indicating device is especially adaptable for use in any of the commercial containers, used for batteries of this class. The invention can be applied either internally or externally, to indicate the condition of the elements by a light or by sound as preferred, and further may if necessary, be constructed to record the exact time that the battery becomes exhausted. It may also be designated so that the action of eating away of the zinc electrode may be directly converted into mechanical movement.

The device of the invention includes in part a switch adapted to be employed in conjunction with one of the elements of the battery, preferably the positive element, in a manner to be released at a predetermined state of disintegration of said element and in a way to close the switch and thereby form a circuit that may be used to throw in new elements, cells, bells or lights, as may be desired.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts through the several figures of the accompanying drawings forming a part of this specification, and upon which, Fig. 1 shows a central vertical sectional view of a cylindrical form of commercial type of primary battery suspended from a cover and within a container equipped with my improvement to boost the voltage by introducing a new element;

Fig. 2 shows a detached plan view of the assembled cylindrical elements shown in Fig. 1;

Fig. 3 is a central vertical section through the assembled elements shown in Fig. 1, said section being taken at a right angle to that of Fig. 1;

Fig. 4 shows a detail view of the switch mechanism shown in Fig. 3, but in a closed position;

Fig. 5 is a further central vertical sectional view of an assembled cylindrical element, suspended from a cover and to which a modified form of my invention is shown applied for the operation of an externally located signal to indicate the state of approaching exhaustion;

Fig. 6 is a further central vertical section of the parts shown in Fig. 5, but taken at a right angle to that of Fig. 5;

Fig. 7 shows diagrammatically the invention as applied for the operation of an externally located switch and signal;

Fig. 8 shows another application of my invention adapted to automatically move a sliding contact on a resistance coil;

Fig. 9 illustrates another form in which the invention may be used and whereby the effect of the eating away of the zinc is noted at several predetermined stages cutting out a resistance to compensate for drop in battery voltage; and Fig. 10 shows a form of battery wherein the zinc electrode is connected to a mechanically operated indicator, that shows the state of exhaustion of cell or graduated sector.

Referring in detail to the characters of reference marked upon the drawings, 10 represents a battery jar, 11 a cover therefor which is preferably made of porcelain or other suitable material. This cover is provided with the usual central hole 12 through which a suspending bolt 13 is positioned for the support of the assembled battery elements. The suspending bolt includes a head 14 between which and the cover, a yoke 15, the switch contact plate 16 and the nut 17 are positioned electrically connecting 13, 14, 15, 16 to negative element 25. The upper and outer exposed threaded end portion of the bolt is provided with one or more binding nuts 18 for the attachment of the conducting wire 19 attached thereto, said post thus forming one of the poles of the battery. The cover further includes a hole 20 to accommodate the conducting wire 21 attached to the opposite elements of the battery through the bolt 22 as will be again referred to.

23 represents a pair of insulator members positioned opposite each other on the top of the cylindrical form of positive and negative elements 24, 25, 26 and 27. The insulator members are bolted to and supported from the before mentioned yoke 15 and form a part of the frame for supporting the assembled elements. An insulating plate 28 is positioned between the yoke and the said insulating members 23 and serves to support the central element 27. The two cylindrical positive elements 24 and 26 are each provided with a pair of extended ears 29 each having a hole therethrough to receive the bolts 22 which are supported in horizontal holes in each of the insulating member 23. By this means the said ears and elements are clamped and secured to the inner and outer faces of the said insulating members in a way to be supported at opposite sides and at an equal distance apart. The larger cylindrical negative element 25 is preferably provided at both its top and bottom edge with an annular cap 30 and has an external winding of fine wire 31 upon its periphery as shown. This element is secured to the insulating members 23 and is electrically connected to the yoke 15 by two rods 32 that extend down through and against the inside of the element, and which are provided with a hook 33 upon their lower ends that engage the under side of the element. The upper ends of these rods are threaded and provided with nuts 34 by means of which the said negative elements are secured to the said blocks, between the two positive elements before mentioned and to also secure the yoke thereto so that the unit as shown, may be supported by a single suspending rod 13.

The central negative element 27 is provided with a cap 35 top and bottom and a central rod 36 by means of which the caps are secured to the cylinder 27. The top end portion of the rod is threaded and provided with nuts 37 for attachment to the before mentioned insulating plate 28 and electrically connected to the spring actuated member 38.

The automatically actuated device of the invention heretofore referred to, may be applied to batteries of the type shown as well as to flat plate type of battery, in various ways and therefore I do not wish to be limited to the particular design of construction. A simple form of an application of the switch is clearly illustrated in Figs. 3 and 4 wherein a metal contact plate 16 is secured beneath the head of the suspending bolt 13 and has its free end disposed outward for the engagement of the spring actuated member 38 of the switch which is secured to the under side of the insulative plate 28 and to the suspending rod 36 of the negative element 27. This spring actuated member 38 is normally held down out of contact with the plate 16 by means of a link 39 whose end portions are insulated one from the other as at 39$^b$. One end of this link is connected to said spring actuated member and the other through a hole 40 in the edge of the positive element 26 so that with the preliminary operation of the battery said member 38 will be held down out of engagement with the plate member 16 until such time as the prolonged action of the battery will have eaten away the edge of the positive element and release the link and spring thereby closing the switch and electrically connecting negative element 27 in parallel with negative element 25 thereby introducing a new element within the cell.

To signal the state of exhaustion as indicated in Figs. 5 and 6 the spring member 38$^a$ is insulatively supported from the hanger 13 and yoke 15 and the link 39 is connected to a hole 40$^a$ in the bottom edge of the outer positive element 24. The contacting post 41 is mounted in the cover, in alignment with the action of the spring actuated member 38$^a$ so that when the latter is released it will engage the end of the post and close the circuit. This circuit is represented by a wire 42 one end of which is connected between nuts 43 and the other to the short end of the arm 38$^a$, said circuit further including a battery 44 and a lamp 45. This lamp is merely one form of signal which might be employed to indicate the condition of the battery, it being obvious that a bell or other indicating device may be employed instead of the light if desired. This circuit can also cover any desired area so as to signal at a point distant from the battery if required.

Fig. 7 illustrates a form of indicating device wherein the link 39 is attached to the top edge of one of the positive elements and the upper end is connected to a switch 46 which may be located distant from the cell while the remaining portion of the circuit may be like that shown in Fig. 6.

It will be obvious that a battery of this sort may be employed as one of a series, as for instance the zinc illustrated as 24′, so far as the purposes of my invention are concerned, might be one of those employed in the series indicated by 44.

In Fig. 8 I have shown a construction wherein the eating away of the lower edge of the tapered zinc electrode 24′, caused by the operation of the battery, is directly employed to automatically produce mechanical movement which in this instance is utilized for operating a sliding contact 47 for a resistance 48 through the assistance of a spring 49 one end of which is secured to the post 50 and the other to an insulating block 51 in which the said contacting member 47 is mounted. 42′ represents a circuit, one end of which is connected to the contacting member 47 and the other to one end of the resistance 48.

In Fig. 9 I have shown three connecting links 39ª, 39ᵇ and 39ᶜ, with the zinc electrode 24″, and designed to operate through a battery circuit 42′ and resistance coil 52, to insure a more uniform discharge of current from the battery. As for instance it will be seen that the link 39ª is connected through a hole in the upper reduced portion 53 of the zinc 24″ which hole is relatively near the top edge and thus adapted to be released before the other two links 39ᵇ and 39ᶜ, which are later released in their respective orders as the edge portion of the zinc is further consumed. The upper ends of each of these links above referred to are connected to switch levers 54, 54′ and 54″. The other ends of said levers are pivoted at 55 and are actuated by springs 56 that serve to respectively throw the levers into contact with the points 57 positioned at spaced distances apart and connected with the resistance coil. From this it will be seen that sections of the resistance coil 52 will be successively cut out during discharge to compensate for drop in battery voltage. When the zinc has been used to a point where the first link is released, a section $x$ of the resistance is cut out and a uniform voltage of the battery is maintained, and so again with the release of the second link 39ᵇ and the cutting out of the intermediate section $y$ as the element 24′ is a zinc element in one of the cells comprising the battery which supplies circuit 42′ each link is insulated at 40ª, 40ᵇ and 40ᶜ.

The same novel feature as illustrated in Fig. 8, of converting the disintegration of the positive electrode into mechanical movement, independent of the action of the battery, is illustrated in Fig. 10 and wherein said mechanical action is utilized to operate a mechanical indicator. This device consists of a bracket 58 and a graduated sector 59 secured to the central binding post 13′ of cell. Pivot 60 carries a weighted hard rubber lever 47′ that holds the hook of link 39ª against the bottom edge of zinc.

In operation during discharge the tapered zinc is consumed from the bottom upwards allowing hook of link actuated by the weight on lever 47′ to follow upward so that the pointer will promptly indicate the state of exhaustion of the cell on the graduated sector 59.

This type of indicator is especially adaptable to opaque containers

As all these types of cells in the same series are uniform in their operation, it is only necessary to equip one cell of the battery with this indicator.

Having thus described my invention, what I claim and desire to secure by Letters Patent is:

1. The combination with a primary battery including a positive and a negative electrode and an active solution therefor, of a circuit making and breaking device, connections therewith and with one of the said electrodes adapted to be automatically released at a predetermined time to operate the circuit closing device.

2. The combination with a primary battery including a positive and a negative electrode and active solution therefor; of a circuit making and breaking device, means connecting the same with the edge portion of one of the electrodes in a manner to be released therefrom by the disintegrating of said element due to the operation of the battery.

3. In a primary battery including a copper oxide and zinc element, of means for indicating the state of exhaustion of the battery, including a switch, and means connecting the operative member of the switch with the positive element so that when the latter is eaten away by the action of the battery, the member will be released and the switch closed.

4. The combination with the positive and negative electrodes of a primary battery and means for supporting the same in a jar, of a fixed and movable switch member carried by the supporting means, means connecting the movable member and positive element in a way to be automatically released at a predetermined time by the disintegrating of the positive element.

5. In a primary battery including a positive and negative element, and an active solution in which the elements are submerged, an extra element also contained within the solution, a switch connected with the last named element, means connecting one member of the switch and the positive element for normally holding the switch open, but adapted to be released when the positive element disintegrates.

6. A primary battery comprising a positive and negative element, and an active solution in which the elements are submerged in a manner to cause the eating away of the positive element by the operation of the battery, a mechanically operatable device connected with the positive element and adapted to be automatically operated by the decomposition of the positive electrode.

7. A primary battery comprising a positive and negative element, and an active solution in which the elements are submerged in a manner to cause the eating away of the positive element by the operation of the battery, a means connected with the portion of the positive element to be eaten away, and adapted to be released by said action and devices connected with said means for indicating said operation of zinc.

8. A primary battery comprising a positive and negative element, and an active solution in which the elements are submerged in a manner to cause the eating away of the positive element by the operation of the battery, an indicating device and means connecting said indicating device with a portion of the positive element to indicate the gradual consumption of the said zinc.

Signed at Waterbury, Conn., in the county of New Haven, and State of Connecticut, this 27th day of October, A. D., 1921.

EDMUND H. BECKER.

Witnesses:
HARRY T. HUBERT,
JAMES G. ROSS.